INVENTORS.
Dexter P. Cooper, Jr.
and
BY Jeanne A. Dainis
Brown and Mikulka
and
Donald M. Sandler
ATTORNEYS INVENTORS.
Dexter P. Cooper, Jr.
and
Jeanne A. Dainis
BY
Brown and Mikulka
and
Donald M. Sandler
ATTORNEYS 3,290,434

COLOR TELEVISION RECEIVER INCLUDING DISPLAY MEANS COMPRISING TWO UNIFORMLY DISTRIBUTED LUMINESCENT MATERIALS

Dexter P. Cooper, Jr., Lexington, and Jeanne A. Dainis, Somerville, Mass., assignors to Polaroid Corporation, Cambridge, Mass., a corporation of Massachusetts Filed July 24, 1963, Ser. No. 297,341
18 Claims. (Cl. 178—5.4)

This invention relates to color television systems, and more particularly, to a color television system of the type which operates on the so-called "red-white" principle.

The conventional color television system in commercial use in the United States at the present time involves a three-color additive process. Using filters, the scene being televised is separated into red, blue and green color-separation images, the latter being scanned in a conventional manner to produce red, blue and green video signals that characterize the color-separation images and are used to drive a tri-color kinescope. The red signal is used to reproduce the red color-separation image in red light matching the red filter; the blue signal is used to reproduce the blue color-separation image in blue light matching the blue filter; and the green signal is used to reproduce the green color-separation image in green light matching the green filter. The superposition of the three images so formed reproduces the scene being televised on the tri-color kinescope in full color.

Basically, the "red-white" process of color television involves a bi-color kinescope upon which the red color-separation image is reproduced in reddish light (that need not necessarily match the red filter by which this color-separation image is formed) and the green color-separation image is reproduced in achromatic light. By a process not entirely understood at the present time, an observer sees a reproduction of the scene being televised with good color fidelity. That is to say, an observer viewing the kinescope sees all of the colors in the original scene in the correct hierarchical order, even though only reddish and achromatic light is emitted from each picture element of the kinescope.

So far as is known, the approach of the prior art to the construction of bi-color kinescopes, with which the "red-white" process can be practiced, has been to consider the bi-color kinescope as merely two-thirds of a conventional tri-color kinescope. Thus, it has been suggested to modify a kinescope of the type having an aperture mask whose openings are precisely aligned with arrays of very small primary color dots arranged in a regular manner over the viewing screen, such that a "white" phosphor is substituted for the blue or green phosphor of each array. This expedient permits the "red-white" color television process to be successfully practiced, but the requirement for precision in the alignment of the color dots with the openings in the aperture mask is not lessened. The complexity inherent in the manufacture of such kinescopes for the conventional three-color additive process has led to attempts to use superposed luminescent layers, with each layer producing a separate color. It is well known, of course, that chromatic variations in the light output of a screen composed of superposed layers of different colored phosphors can be produced by varying the velocity of electrons impinging upon such a screen. If the velocity is such that only the first layer is penetrated, most of the energy of the electrons is given up to the first layer, and the color seen by an observer will be that due to the phosphor of the first layer. If the velocity is increased such that electrons penetrate only to the second layer underlying the first layer, most of the energy of the electrons is given up to the second layer and the color seen by an observer will be essentially that due to the phosphor of the second layer. The contribution of color by the first layer can be redued by interposing between the two luminescent layers, a non-luminescent layer, and by making the second layer much thicker than the first. This permits the difference between the accelerating voltages necessary to effect selective penetration to be increased, and at the higher velocity associated with the higher voltage, less energy is lost to the first layer. However, the deficiency of this approach, even if only two luminescent layers are used for the "red-white" system, instead of three for the "red-blue-green" system, becomes apparent when the voltage-penetration characteristics of electrons in luminescent materials is considered. A study by W. Ehrenberg and D. E. King entitled, "The Penetration of Electrons Into Luminescent Materials," and reported in Proceedings of the Physical Society, vol. 81, Part 4, No. 522, pp. 751–766 (1963), indicates that the ultimate penetration of a 10 kv. beam of electrons into calcium tungstate, a typical blue light producing phosphor, is only about 2$\mu$. However, substantially all of the energy is given up to produce visible light at a depth of less than 1$\mu$. At 50 kv., most of the energy is given up to produce light at a depth of about 12$\mu$. Thus, it is theoretically possible to construct a screen wherein powdered phosphors are used, since the grain size of such phosphors can be as small as 1 to 3$\mu$ in diameter and layers several grains thick can be built up to provide a reasonably efficient screen. For example, U.S. Patent No. 2,566,713, granted September 4, 1951, to V. K. Zworykin, discloses a three-layer kinescope that requires voltges of 10 kv., 25 kv. and 50 kv. to produce, respectively, the green, blue and red color-separation images. The problem is to switch these voltages at a rate sufficient to present to an observer, superposed green, blue and red images that will reproduce the scene being televised in full color without annoying flicker or reduction in color fidelity.

While technically feasible, a system of this nature involving such large voltages and high switching rates is not desirable for use in domestic kinescopes. Accordingly, the magnitude of the voltages can be reduced by using films of phosphors which are evaporated into place, since such films can be made exceedingly thin. This approach to a tri-color kinescope is disclosed in British Patent No. 901,367, published July 18, 1962, wherein voltages in the 10 kv. to 20 kv. range are envisioned. While this is a more acceptable range, formidable obstacles to efficient switching are still present. In addition, fabrication of a multi-film kinescope is complicated because after each luminescent film is deposited, it must be activated by baking the kinescope at very high temperatures prior to evaporating on the next film. This factor, plus the difficulty in accurately controlling film thicknesses as well as their doping, from kinescope to kinescope, operate against the mass production of inexpensive picture tubes having identical color response characteristics.

It is therefore a primary object of this invention to provide a color television system of the class described employing a bi-color kinescope whose construction is not subject to the difficulties outlined above and which requires significantly smaller operating voltages than has heretofore been achieved.

Briefly, the bi-color kinescope of the present invention has two superposed layers of different luminescent granular phosphors that emit light of complementary hues upon electron excitation. However, the layer first impinged upon by the electron beam of the kinescope is defined by grains of red light emitting phosphor that are uniformly distributed over the viewing screen but permit a portion of the beam at any instant to penetrate this layer without substantial energy loss; while the other layer is defined by grains of minus-red light emitting phosphors that are uniformly distributed and completely cover the screen. In other words, vacancies exist in the layer first impinged upon and interstitial electrons from the beam can penetrate beyond this layer without substantial energy loss. However, the grains of this layer, being of the order of 4 microns in diameter are substantially opaque to all intercepted electrons. A non-luminescent barrier layer is interposed between the two luminescent layers of such thickness as to be opaque to interstitial electrons accelerated by the lower of the two accelerating voltages. Thus, if the red video signal modulates the beam current at the lower of the two accelerating voltages, the red color-separation image will be reproduced on the viewing screen in red light. At the higher of the two accelerating voltages, the barrier layer becomes transparent to interstitial electrons and the beam will excite both layers. By a suitable choice of accelerating voltage, barrier layer thickness and composition, and amount of the screen covered by the red light emitting grains, the amount of red light emitted over an elemental area defined by the beam width will be substantially the same as the amount of minus-red light with the result that the light at the elemental area will be achromatic. Thus, if the green video signal modulates the beam current at the higher of the two accelerating voltages, the green color-separation image will be reproduced on the screen in achromatic light. The above construction permits accelerating voltages to be used which are of the same order of magnitude as that found in monochromatic kinescopes, and also permits the difference between the two accelerating voltages of a bi-color kinescope to be reduced below any level previously found practical. Such difference is small because the bi-color kinescope of the invention is used in a color television system based on the "red-white" principle instead of the three primary colors principle. That is, the second color (considering "white" to be a color) is obtained by equally exciting, over an elemental area, both layers of the tube, whereas the second color in a kinescope based on the three primary colors principle is obtained by exciting the underlying layer to a much greater extent than the overlying layer in order to have one color dominate the other. Equal excitation is achieved at a lower voltage thereby achieving the desired results.

It has also been discovered that certain non-luminescent barriers (e.g., zinc sulfide) have an apparent electron transmissivity that increases with increases in the velocity of the interstitial electrons when measured by the light output of the underlying luminescent layer. As a result, it is possible to further reduce the difference between the two accelerating voltages.

Fabrication of the bi-color kinescope of the present invention is materially facilitated by the fact that conventional powdered phosphors are used. Thus, the minus-red layer is settled first, the barrier layer evaporated thereon to the required thickness, and then the red layer is sprayed or settled in such a manner that vacancies exist between grains. No alignment of an aperture mask is necessary nor is any baking at high temperatures required.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein.

Figure 1:
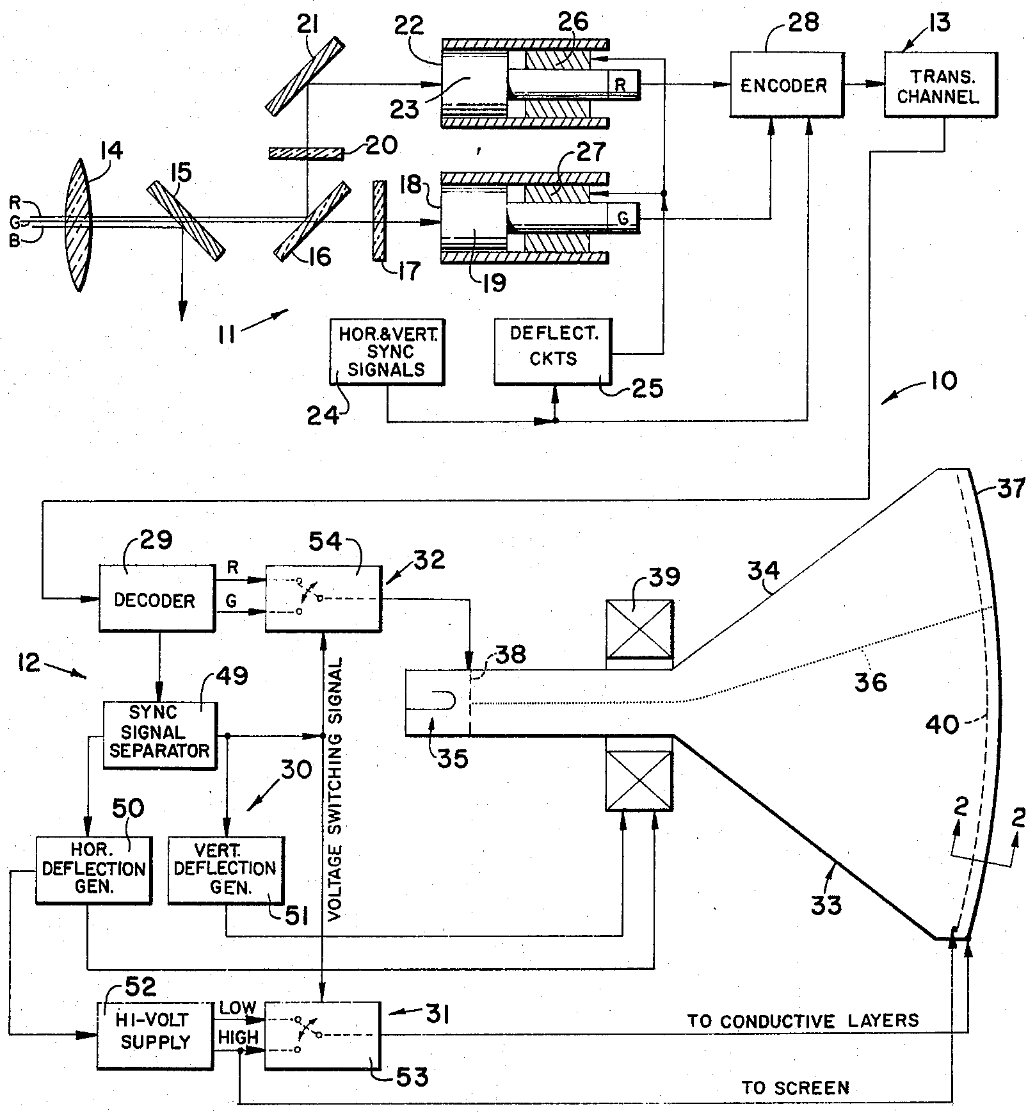
FIGURE 1 is a simplified schematic diagram showing the components of a camera, transmission system and a novel receiver built in accordance with the present invention.

Referring now to FIGURE 1, reference numeral 10 designates a color-television system of the type described comprising camera 11 coupled to receiver 12 through transmission channel 13. Camera 11 is essentially two-thirds of a conventional three-color image orthicon camera shown and described in Color Television Manual, second edition, 1959, published by Radio Corporation of America, Camden, New Jersey, and the following description is for reference purposes. Light from the scene being televised passes through relay lens 14 onto blue reflecting dichroic 15 to red reflecting dichroic 16. Green light from the scene then passes through a green trimming filter 17 and onto photocathode 18 of green image orthicon 19. Red light from the scene passes through a red trimming filter 20 and is reflected off front-surface mirror 21 onto photocathode 22 of red image orthicon 23. There is thus formed at photocathode 18, a green color-separation image of the scene being televised, and at photocathode 22, a red color-separation image. Only two image orthicons are shown and described because the blue image orthicon normally associated with a conventional three-color television camera is not needed in a "red-white" system. Hence, the highly simplified block diagram of FIGURE 1 omits the third image orthicon.

Drive pulses are obtained from source 24 which operates common deflection circuit 25, the latter being connected to deflection coils 26, 27 and causing deflection of the scanning beams of the two image orthicons in synchronism according to a given periodic program. Preferably such program is the conventional odd-line interlaced scanning system, although as will be apparent from the further description of the invention, other periodic programs could be used. The output of green image orthicon 19 is produced by the scan of photocathode 18 and is a video signal termed the "green video signal" for convenience. Similarly, the output of red image orthicon 23 is produced by the scan of photocathode 22 and is a video signal termed the "red video signal." At any instant of time, the elemental area being scanned on each photocathode corresponds to the same elemental area of the scene being televised. Thus, at any instant, both video signals are representative of the brightness of different colored light emanating from the same elemental area of the scene. The dominant wavelengths of such different colored light are at different ends of the visible spectrum. That is, the dominant wavelength of the red color-separation image is longer than the dominant wavelength of the green color-separation image, and is of course in the so-called "long-wavelength" region of the visible spectrum. The dominant wavelength of the green color-separation image is in the "short-wavelength" region of the visible spectrum. The actual values of dominant wavelengths of the two-color separation images are not believed to be critical except that the longer one apparently should be at least about 580 m$\mu$ and the short one apparently should be no more than about 540 mμ. These two dominant wavelengths are passed by Wratten filters No. 15 and No. 58 respectively. It has been found, however, that the red and green signals associated with commercially available three-color television cameras are adequate for producing full-color reproduction of the scene with good color fidelity using the novel bi-color kinescope described herein.

Encoder 28 is intended to symbolically represent the preamplifiers, etc., associated with preparing the two video signals and synchronizing signals for transmission to receiver 12. For example, if transmission channel 13 is an RF link, transmission may be in accordance with N.T.S.C. standards. In such case, encoder 28 may include a gamma corrector, a matrix section, a filter section, a modulator section and a mixer section all as shown and described in Color Television Manual (supra). Decoder 29 would include detectors, demodulators, filters, etc., such that the output thereof is constituted by the red and green video signals, the blue signal, if available, not being used. On the other hand, if transmission channel 13 were a coaxial link, suitable apparatus well known in the art would be used to provide at the output of decoder 29 at least the red and green video signals and the sync information.

Receiver 12 includes deflection circuit 30, accelerating voltage control circuit 31, beam intensity control circuit 32, and bi-color kinescope 33. Kinescope 33 is defined by an evacuated envelope 34 having at one end, an electron gun schematically illustrated at 35 that produces a beam of electrons 36 focused by conventional means (not shown) to converge on the covering of target assembly 37 at the other end of the kinescope. A control plate illustrated schematically at 38 is interposed in the path of the beam such that a control voltage applied thereto is effective to intensity modulate the beam. Deflection coils, illustrated schematically at 39, surround the neck of kinescope 33 and control the deflection of beam 36. Also contained within the envelope is metallic screen 40 whose function is to cause the image size on target assembly 37 to remain substantially constant as the accelerating voltage is varied.

Figure 2:
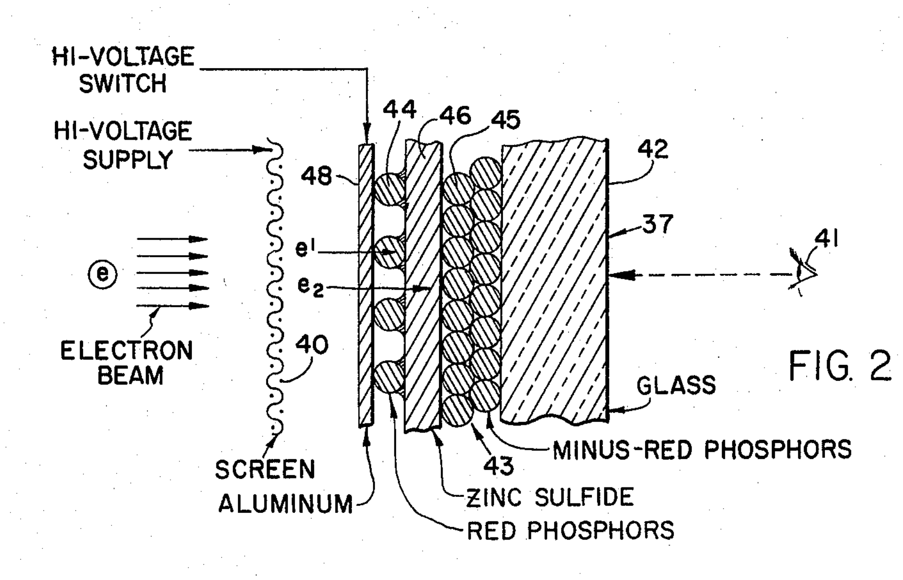
FIGURE 2 is a section taken along the line 2—2 of FIGURE 1 for the purpose of illustrating in more detail the composite nature of the target assembly of the cathode-ray tube of the receiver.
Figure 3:
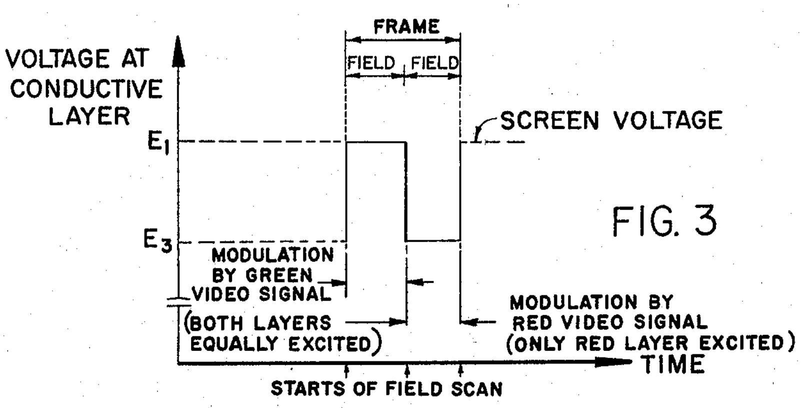
FIGURE 3 is a synchronizing diagram showing how the accelerating voltage is synchronized with the modulation of the beam intensity.

Target assembly 37 defining a raster is shown in more detail in FIG. 2. The viewing screen seen by an observer's eye 41 is the glass end face 42 of the kinescope opposite from the electron gun 35. Covering 43 on the raster comprises two superposed layers 44, 45 of different cathodoluminescent material, between which non-luminescent barrier layer 46 is interposed. Because no high temperature baking of the covering is necessary to activate the luminescent materials, envelope 34 may be the same as an envelope used in a monochrome kinescope. The preferred construction is to first deposit underlying layer 45. Such layer completely covers the raster and is composed of material which emits minus-red (cyan) light under electron excitation. To facilitate fabrication, the material of layer 45 is preferably granular in nature, and is applied on the tube face by settling the granules from a water suspension thereof that includes a small amount of potassium silicate which acts as a binder upon evaporation of the water. An example of a suitable material for layer 45 is TV phosphor Type No. 137 available from Sylvania Electric Products, Inc., which is a zinc activated zinc oxide phosphor having an average grain size from 3 to 10 microns. A substantially uniform layer approximately two grains in thickness is adequate, and will be optically translucent. To provide an even support for barrier layer 46, a thin layer of material such as collodion is applied to layer 45 prior to evaporating layer 46 into place over layer 45. The barrier layer must be optically translucent, and preferably, it is a thin film of non-luminescent material vacuum deposited into place. At this point, it should be mentioned that one of the purposes of this layer is to prevent electron excitation of layer 45 at the lower of the two accelerating voltages, and to effect excitation of layer 45 at the higher of the two accelerating voltages. The thickness and material of layer 46 depend upon factors which are discussed later.

Overlying layer 44 covers less than the entire raster and is composed of material which emits red light under electron excitation. As was the case with layer 45, the material of layer 44 is granular in nature and can be applied over the barrier layer by settling the granules from a water suspension thereof that includes a small amount of potassium silicate. An example of a suitable material for layer 44 is TV phosphor Type No. 151 available from Sylvania Electric Products, Inc., the latter being a manganese activated zinc phospate phosphor having a grain size of from 3 to 6 microns. However, the concentration and amount of the suspension is so controlled that, while the grains will be uniformly distributed over the raster, vacancies will exist between the grains. The percentage of coverage, which is to say the percentage of electrons that impinge layer 44 and experience a substantial energy loss thereto, the thickness of the barrier layer and the composition thereof, are interrelated with the accelerating voltages as will be shown later.

A final collodion film is laid down over layer 44 to provide a smooth base for aluminum coating 48 which is evaporated to a thickness such that there is about a 10% transmission of light. The two collodion layers applied during the fabrication of the kinescope are volatilized by a low grade heating of the tube and thus do not appear in the completed target assembly. Conductive layer 48 is electrically connected to the conventional conductive coating on the inner surface of the kinescope by applying, for example, silver conductive paint around the edge of the target assembly. Metal screen 40, parallel to the surface defined by face 42 and covering the entire raster, is then rigidly mounted interior to the envelope as close as possible to layer 48 but electrically separated therefrom.

Deflection circuit 30 of receiver 12 includes conventional sync signal separator 49 which separates the horizontal sync pulses occurring during the blanking period between lines, and the vertical sync pulses occurring during the blanking period between fields. The respective separated sync pulses drive horizontal deflection generator 50 and vertical deflection generator 51. The outputs of the two deflection generators are applied to deflection coils 39 to lock the scan of electron beam 36 in synchronism with the scans of the color-separation images at camera 11. As is conventional, the high-voltage necessary to accelerate the electron of the beam may be associated with the horizontal deflection circuit. This is indicated schematically at 52, the high-voltage supply furnishing a constant voltage of the order of 15 kv. to screen 40. Provision is made to tap-off a lower voltage, of the order of 9 kv., from the high-voltage supply. The two voltages are made available to electronic switch 53 which selects one of the two voltages and applies it to conductive layers 47, 48. If the kinescope is to be operated in a field-sequential mode, which is to say the electron beam is to excite the red light producing layer 44 during one field scan, and then excite both layer 44 and 45 to produce achromatic light during the next field scan, switch 53 is advantageously controlled by the vertical sync pulses. In this manner, the voltage on layer 48 is kept at the lower of the two accelerating voltage levels during one field scan and at the higher of the two levels during the next, etc. All electrons emitted by gun 35 are accelerated to the same degree by the constant voltage on screen 40, regardless of the voltage on layer 48 so that the ultimate deflection of the beam and hence the image size becomes substantially independent of the voltage on layer 48, and the image size remains substantially constant.

Recalling that the red and green video signals are available at the output of decoder 29, it is the function of beam intensity control circuit 32 to alternately apply these two signals to grid 38 in proper relation to the accelerating voltage. To this end, electronic switch 54 is also controlled by the vertical sync pulses such that the signal controlling the beam intensity is correctly synchronized with the accelerating voltage to which electrons of the beam are subjected.

Figure 4:
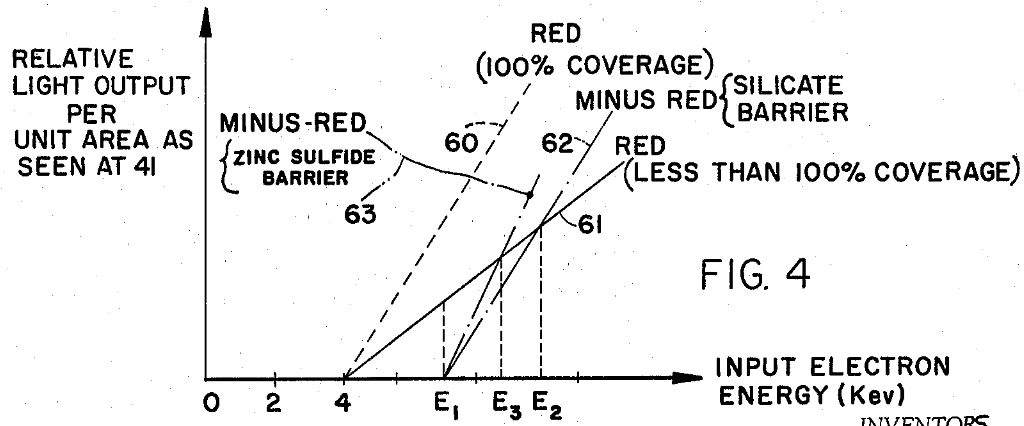
FIGURE 4 illustrates the manner in which the relative amount of light emitted from a unit area of the raster of the target assembly varies in accordance with the initial energy of electrons.

When the lower of the two accelerating voltage levels is applied to layer 48, electrons passing from screen 40 to the luminescent layers are decelerated to a velocity such that the grains of layer 44 are opaque to the electrons. Electrons $e_1$ intercepted by the grains excite the latter into emission of red light which an observer views through transparent layers 45, 46 and 47. Interstitial electrons $e_2$, namely those electrons passing in the vacancies between the grains of layer 44 without substantial energy loss, penetrate beyond the layer into barrier layer 46 and make no contribution to the radiant output from layer 44. The relative amount of red light emitted from a unit area of viewing screen is thus directly proportional to the coverage of the raster by the grains of layer 44. Referring now to FIG. 4, it is seen that electrons having an energy of about 4000 electron volts (4 kev.) are required to produce substantial emission on intercepting the grains of layer 44. As the energy is increased, the light output is increased. The rate of increase depends, of course, on the coverage of the grains as can be seen by comparing curve 60 with curve 61.

Recalling that the purpose of barrier layer 46 is to prevent excitation of layer 45 when the lower of the two accelerating voltages is applied to layer 48, the barrier must be thick enough to at least slow down interstitial electrons so that they have insufficient energy to excite layer 45 to emit visible light, even if the thickness is insufficient to render the barrier opaque. However, as the energy of the interstitial electrons increases, a point is reached at which electrons penetrate barrier layer 46 and have sufficient energy to initiate excitation of layer 45. Beyond the point at which layer 46 thus becomes transparent ($E_1$ of FIG. 4), further increases in energy of the beam cause the relative light output from layer 45 per unit area of the screen to increase at a faster rate than the relative light output from layer 44 per unit area due, in large part, to the difference in relative coverage of the screen by the two types of grains as well as the relative emissive efficiency of the grains. tA an energy of $E_2$, the amount of red light emitted by layer 44 over an elemental area defined by the beam width (picture element) is substantially equal to the amount of minus-red light emitted by layer 45 (including any diminution of the red light by its passage through the barrier layer and the underlying luminescent layer) with the result that achromatic light is emitted from the elemental area. The term "achromatic light" as used herein is intended to mean light that lacks substantial hue commonly referred to as "white" light. Since color fidelity is color reproduction which pleases an observer esthetically, and convinces him that he is viewing an accurate reproduction of the original colors of the scene being televised, it is contemplated that the "achromatic" light can be made "warm" or "cool" for this purpose by proper selection of the higher of the two accelerating voltages.

The energies $E_1$ and $E_2$ establish the required accelerating voltages. That is to say, the lower of the two accelerating voltages is chosen to yield electrons of energy $E_1$, and the higher of the two voltages is chosen to yield electrons of energy $E_2$. In this manner, electrons $e_1$ (electrons intercepting grains in layer 44) are effective to produce red light at either of the two accelerating voltages, but only electrons $e_2$ (interstitial electrons) are effective to produce minus-red light at the higher of the two accelerating voltages. It can now be seen that during one field scan of beam 36, the lower of the two accelerating voltages is applied to layers 47, 48, while the intensity of the beam (rate at which electrons impinge the screen) is controlled by the red video signal applied to plate 38, causing the beam to reproduce on the raster in red light that part of the red color-separation image traversed by the scan thereof during said one field scan. During the next field scan of beam 36, the higher of the two voltages is applied, while the intensity of the beam is controlled by the green video signal applied to plate 38 causing the beam to reproduce on the raster in achromatic light that part of the green color-separation image traversed by the scan thereof during said next field scan. The two fields, making up a single frame, are held in registration because of screen 40, the latter being maintained at a constant voltage so that the deflection of all electrons in beam 36 becomes substantially independent ofthe voltage applied to layers 47, 48.

While a non-luminous silicate barrier layer is satisfactory in that it provides a reasonably sharp cut-off energy $E_1$, such a barrier has an electron transmissivity that is substantially independent of electron energy. The term electron transmissivity is intended to mean the ratio of the number of output electrons per input electron as measured by the emissive output of a luminescent underlying layer. For a silicate barrier layer, the electron transmissivity is essentially a step-function with the discontinuity occurring at the energy $E_1$. However, it has been found that a barrier layer of zinc or cadmium sulfide, in the configuration disclosed herein, apparently has an electron transmissivity that increases with increases in electron energy beyond the cut-off energy. The effect of this unexpected non-linear phenomenon is suggested by curve 63 in FIG. 4 wherein the slope of curve 63 is greater than the slope of curve 62. Since the intersection of curve 63 with curve 61 defines the energy that electrons of a beam must possess in order to cause the emission of achromatic light from an elemental area, the non-linear response of the zinc cadmium sulfide barrier layer permits an intermediate energy $E_3$ to be used to practice the invention in the manner previously described.

At the present time, it appears that zinc sulfide is preferable. A covering for the viewing screen that permits operation of the kinescope at the 9 kv. to 15 kv. range already described, and achieves good color fidelity, is as follows: layer 45 formed by settling on the screen about 1.8 milligrams of the blue-green phosphor per square centimeter of the raster; layer 46 formed by evaporating zinc sulfide to a thickness of about five fringes over layer 45; and layer 44 formed by settling on layer 46 about 0.6 milligram of the red phosphor per square centimeter of the raster. Reasonable results, considering the subjective nature of color perception, have also been obtained with screen 40 held at 5 kv. and the voltage at layer 48 modulated between 2.5 kv. and 5 kv.

The essence of the present invention resides in constructing the luminescent layer first impinged upon by the electron beam such that a portion of the beam defining a picture element penetrates the layer without substantial loss of energy. A layer of this nature is constructed using powdered phosphors by providing less than complete coverage of the viewing screen where the term "less than complete coverage" has the meaning that a portion of the beam defining a picture element penetrates the layer without substantial energy loss. Adequate results are obtained when the coverage is such that about 30% to 50% of the electrons impinging upon the overlying layer penetrate the same without substantial energy loss. To a first approximation, this is achieved when the grain size is small with respect to the size of the beam and the projected area of the grains on the raster constitutes about 50% to 70% thereof.

It can now be appreciated that receiver 12 is compatible with the conventional three primary color additive system of color television. That is to say, camera 11 and transmission channel 13 may provide red, blue and green video signals (and the associated sync signals) to drive tricolor kinescopes of the conventional type described above, but receiver 12, using only the red and green signals, could nevertheless be used therewith.

While it is presently preferred to utilize standard granular phosphors in fabricating the target assembly because of the ease with which assembly is achieved, the present invention is also applicable to the more complex target assembly formed by the vacuum depositions of the two luminescent layers as well as the barrier layer. In such case, the layer first impinged upon by the electron beam would be vacuum deposited through a mask to produce a thickness gradient whose value varies periodically over the raster. Operation would be as previously described except that the voltages would be chosen so that at the lower of the two accelerating voltages, the overlying luminescent film would be opaque to intercepted electrons and the barrier layer opaque to interstitial electrons; while at the higher of the two accelerating voltages, the overlying luminescent film as well as the barrier layer would be transparent to all electrons. The chief advantage of this embodiment resides in the fact that the order of the layers is immaterial.

While the above description contemplates field sequential scanning whereby the odd lines of the raster, for example, are reproduced in red light interlaced with the even lines in achromatic light, it is obvious that either dot-sequential or frame sequential scanning could also be used. In addition, it should be noted that sequential scanning is required when a single electron gun is used. Where two electron guns are available, simultaneous rather than sequential excitation of the target assembly can be achieved. In the latter situation, it is possible to individually control the velocity of the beams of each gun, so that the beam of the gun producing the lower energy electrons would be intensity modulated by the red video signal and the beam of the gun producing the higher energy electrons would be intensity modulated by the green video signal. If both beams are focused to converge at a point on the raster, the result will be a simultaneous rendition of two color-separation images in red and achromatic light.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A color television receiver comprising:

(a) receiver means responsive to received color television signals for producing at least two video signals representing respective color separation image components of different dominant wavelengths scanned in synchronism according to a periodic program;

(b) a kinescope comprising a target assembly defining a raster;

(c) said assembly including a covering on said raster which comprises two superposed layers of material, each of which emits chromatic light of different dominant wavelengths when electrons impinge thereon and excite the same;

(d) the material of the layer first impinged upon by electrons being uniformly distributed over said raster but covering only a portion thereof such that about 50% to 70% of the electrons impinging upon the last mentioned layer transfer thereto a substantial amount of their energy;

(e) the hues of the chromatic light emitted by said two superposed layers of material being substantially complementary so that substantially achromatic light is produced by the simultaneous excitation of both of said layers over a given elemental area on said raster in a manner which causes emission of substantially the same amount of light from each layer;

(f) means to produce a beam of electrons focused on said covering and caused to scan the raster in accordance and in synchronism with said periodic program for exciting said layers;

(g) means to accelerate electrons in said beam during a first portion of said periodic program such that only the layer emitting chromatic light of the longer dominant wavelength is substantially excited;

(h) means to accelerate electrons in said beam during a second portion of said periodic program such that both of said layers are simultaneously excited in the same elemental area to emit substantially the same amount of light;

(i) means to modulate said beam during said first portion of said periodic program with the video signal representing one color-separation image component of relatively long dominant wavelength for causing said beam to reproduce on said raster in chromatic light of the longer dominant wavelength said one color-separation image component; and (j) means to modulate said beam during said second portion of said periodic program with the video signal representing another color separation image component of relatively short dominant wavelength for causing said beam to reproduce on said raster in substantially achromatic light said other color separation image component.

2. A color television receiver in accordance with claim 1 wherein said covering includes a non-luminescent barrier layer interposed between said two superposed layers.

3. A color television system comprising:

(a) means for producing a pair of color-separation images of the scene being televised, one of said color-separation images having a longer dominant wavelength than the other;

(b) means to individually scan said images in synchronism according to a given periodic program for producing a pair of video signals, each of which is associated with the scan of a different one of said pair of images, and both of which are representative, at any instant, of the brightness of elemental areas of the images that correspond to the same elemental area of the scene being televised;

(c) a target assembly including a covering defining a raster;

(d) means to produce a beam of electrons focused on said covering and caused to scan the raster in accordance and in synchronism with a first portion of said periodic program as established by the scan of said color-separation images;

(e) means to produce a beam of electrons focused on said covering and caused to scan the raster in accordance and in synchronism with a second portion of said periodic program as established by the scan of said color-separation images;

(f) means to cause the electrons of said first-mentioned beam to be accelerated to a first velocity and to be intensity modulated by the video signal produced by the scan of said one color-separation image;

(g) means to cause the electrons of said second-mentioned beam to be accelerated to a second velocity, higher than said first velocity and to be intensity modulated by the video signal produced by the scan of said other color-separation image;

(h) said covering comprising two superposed layers of luminescent material, the layer first impinged upon by the electrons of said beams being defined by luminescent grains uniformly distributed over said raster but having a projected area thereon less than said raster, and the other layer being defined by luminescent material completely covering said raster;

(i) said grains being substantially opaque to electrons having a velocity no greater than said second velocity whereby only interstitial electrons from said first- and second-mentioned beams that do not intercept said grains penetrate beyond the layer first impinged upon;

(j) means to prevent interstitial electrons having a velocity no greater than said first velocity from being intercepted by said other layer; and (k) the light emitted by grains that intercept electrons being complementary to the light emitted by said other layer when electrons are intercepted thereby.

4. A color television system in accordance with claim 3 wherein the hue of light emitted by said grains is red, and said means to prevent interstitial electrons having a velocity no greater than said first velocity from being intercepted by said other layer is constituted by a barrier layer interposed between said two superposed layers of luminescent material, said barrier layer being substantially opaque to electrons having a velocity no greater than said first velocity.

5. A color television system in accordance with claim 4 wherein said two superposed layers of luminescent material and said barrier layer interposed therebetween are constructed and arranged so that during said first portion of said periodic program, that part of said one color-separation image traversed by the scan thereof during said first portion of said periodic program is reproduced on said raster in red light; and during said second portion of said periodic program, that part of said other color-separation image traversed by the scan thereof during said second portion of said periodic program is reproduced on said raster in achromatic light.

6. A color television receiver comprising:

(a) receiver means responsive to received color television signals for producing at least two video signals respectively representing relatively long and relatively short waveelngth image components scanned in synchronism according to a periodic porgram;

(b) a kinescope including a target assembly defining a raster;

(c) said assembly including a covering on said raster that comprises two superposed layers of powdered material, the material of one of said layers emitting red light upon electron excitation and the material of the other of said layers emitting minus-red light upon electron excitation;

(d) means to produce a beam of electrons focused on said covering and caused to scan the raster in accordance and in synchronism with said periodic program;

(e) the material of the layer first impinged upon by electrons of said beam covering less than the area of said raster covered by the material of the layer second impinged upon by electrons of said beam;

(f) the materials of said layers being uniformly distributed over said raster and so covering the latter that electrons of a first velocity impinging on an elemental area excite substantially only the materials of said one layer on said area causing the emission of red light therefrom; and electrons of a second velocity impinging on an elemental area excite the materials of both layers on said area causing the emission of substantially achromatic light therefrom;

(g) means to accelerate electrons in said beam to said first velocity during a first portion of said periodic program and to said second velocity during a second portion of said periodic program;

(h) means to modulate said beam during said first portion of said periodic program with the video signal representing said relatively long wavelength image component for causing said beam to reproduce such component on said raster in red light; and (i) means to modulate said beam during said second portion of said periodic program with the video signal representing said relatively short wavelength image component for causing said beam to reproduce such image component on said raster in substantially achromatic light.

7. A color television receiver in accordance with claim 6 wherein said covering includes a non-luminescent electron barrier layer interposed between said two superposed layers.

8. A color television receiver in accordance with claim 7 wherein said barrier layer comprises material selected from the class consisting of zinc sulfide and cadmium sulfide.

9. A color television receiver in accordance with claim 8 wherein said one layer is the layer first impinged upon by electrons of said beam.

10. A color television receiver comprising:

(a) receiver means responsive to received color television signals for producing at least two video signals respectively representing one image component having a dominant wavelength in the long wavelength region of the visible spectrum and another image component having a dominant wavelength in a shorter wavelength region of the visible spectrum, said video signals being produced in synchronism according to a given periodic program;

(b) a kinescope including a target assembly defining a raster;

(c) said assembly including a covering on said raster that comprises two superposed layers of luminescent material, the material of one of said layers emitting red light upon electron excitation and the material of the other of said layers emitting minus-red light upon electron excitation;

(d) the materials of each of said layers being uniformly distributed over said raster but the material of said one layer covering less of said raster than the material of said other layer;

(e) the covering on said raster being so constructed and arranged that electrons of a first velocity impinging on an elemental area excite substantially only the materials of said one layer on said area causing the emission of red light therefrom; and electrons of a second velocity impinging on an elemental area excite the materials of both layers on said area causing the emission of substantially achromatic light therefrom;

(f) means to produce electrons focused on said covering and caused to scan the raster in accordance and in synchronism with first and second portions of said periodic program;

(g) means to accelerate said electrons to said first velocity during said first portion of said periodic program;

(h) means to intensity modulate said first-mentioned beam with the video signal representing said long wavelength image component for causing said electrons to reproduce a corresponding image component on said raster in red light;

(i) means to accelerate said electrons to said second velocity during said second portion of said periodic program; and (j) means to intensity modulate said second-mentioned beam with the video signal representing said shorter wavelength image component for causing said electrons to reproduce a corresponding image component on said raster in substantially achromatic light.

11. A color television receiver in accordance with claim 10 wherein the material of said one layer is substantially opaque to electrons accelerated to said first velocity and to said second velocity.

12. A color television receiver in accordance with claim 11 provided with a barrier layer substantially opaque to electrons accelerated to said first velocity but substantially transparent to electrons accelerated to said second velocity, said barrier layer being interposed between said layers of luminescent material.

13. A color television receiver in accordance with claim 12 wherein said barrier layer has an apparent electron transmissivity that increases at a non-linear rate with increases in electron velocity.

14. A color television receiver in accordance with claim 12 wherein said barrier layer is selected from the class consisting of zinc sulfide and cadmium sulfide.

15. A color television system comprising:

(a) means for producing at least two color-separation images of the scene being televised, one of said color-separation images having a dominant wavelength in the long wavelength region of the visible spectrum and the other of said color-separation images having a dominant wavelength in the shorter wavelength region of the visible spectrum;

(b) means to individually scan said images in synchronism according to a given periodic program for producing a pair of video signals, each of which is associated with the scan of a different one of said pair of images, and both of which are representative, at any instant, of the brightness of elemental areas of the images that correspond to the same elemental area of the scene being televised;

(c) a kinescope comprising a target assembly including a covering defining a raster, electron gun means for producing a beam of electrons focused on said covering, deflection means for causing said beam to scan said raster in accordance and in synchronism with said periodic program as established by the scan of said color-separation images, and intensity control means for selectively modulating the rate at which electrons impinge upon said covering;

(d) said covering comprising two superposed luminescent layers separated by a barrier layer substantially opaque to electrons having a velocity less than a predetermined value;

(e) the luminescent layer closer to said gun means being defined by a plurality of discrete grains that emit red light upon the interception of electrons, said grains being uniformly distributed over the raster but covering less than the entire raster so that over an elemental area defined by said beam, a portion of the electrons of said beam are intercepted by said grains and a portion passes therebetween;

(f) the luminescent layer more remote from said gun means being defined by a material that emits minus-red light upon electron excitation, said last-named material being uniformly distributed over and covering the entire raster;

(g) means to cause electrons in said beam both to be accelerated to a velocity not greater than said predetermined value and to be intensity modulated during a first portion of said periodic program by the video signal produced by the scan of said one color-separation image for causing the beam to reproduce on said raster in red light that part of said one color-separation image traversed by the scan thereof during said first portion of said periodic program;

(h) means to cause electrons in said beam both to be accelerated to a velocity larger than said predetermined value and to be intensity modulated during a second portion of said periodic program by the video signal produced by the scan of said other color-separation image; and (i) the last-mentioned velocity being sufficiently large so that, over an elemental area, electrons passing between grains cause the material of the luminescent layer more remote from said gun means to emit an amount of minus-red light substantially equal to the amount of red light emitted by the grains intercepted by the electrons for causing the beam to reproduce on said raster in achromatic light that part of said other color-separation image traversed by the scan thereof during said second portion of said periodic program.

16. A color television system in accordance with claim 15 wherein said closer layer is of such thickness that electrons of said last-mentioned velocity intercepted by the grains of said closer layer fail to penetrate with said barrier layer.

17. A color television system in accordance with claim 16 wherein said barrier layer has an apparent electron transmissivity that increases non-linearly as the velocity of the electrons of said beam increase beyond said predetermined value.

18. A color television receiver comprising:

(a) receiver means for producing electrical signals including first and second electrical signal components representing, respectively, relatively long and relatively short dominant wavelength contents of scanned picture elements in the scene being televised;

(b) a kinescope having a target screen with a covering thereon comprising at least two cathodoluminescent phosphorus each of which is uniformly distributed over said target screen, one of which phosphors covers less than 70% of the total area of said screen with interstices between such covered areas and emits primarily relatively long wavelength light when excited by electrons and another of which covers at least the interstices between the areas covered by said one phosphor and emits primarily relatively short wavelength light when excited by electrons, electron gun means for producing electrons focused to impinge on said covering, and barrier layer means interposed between said other phosphor and said electron gun means; and (c) means including said electron gun means responsive to said first signal component to produce relatively low energy electrons capable of exciting only said one cathodoluminescent phosphor to produce a first image component of relatively long wavelength light and responsive to said second signal component to produce relatively high energy level electrons capable of exciting both of said cathodoluminescent phosphors simultaneously to produce a second image component of substantially achromatic light.

References Cited by the Examiner

UNITED STATES PATENTS

| | | | |
|---|---|---|---|
| 2,547,775 | 4/1951 | Ramberg | 313—92.5 |
| 2,566,713 | 9/1951 | Zworykin | 313—92.5 |
| 2,590,018 | 3/1952 | Koller et al. | 313—92.5 |
| 2,716,151 | 8/1955 | Smith | 178—5.2 |
| 2,773,929 | 12/1956 | Loughlin | 178—5.2 |
| 2,980,761 | 4/1961 | Pritchard et al. | 178—5.4 |
| 3,003,391 | 10/1961 | Land | 178—5.4 |
| 3,056,853 | 10/1962 | Espenlaub | 178—5.4 |
| 3,204,143 | 8/1965 | Pritchard | 178—5.4 X |
| 3,231,775 | 1/1966 | Pritchard | 313—92 |
| 3,242,260 | 3/1966 | Cooper et al. | 178—5.4 |

DAVID G. REDINBAUGH, *Primary Examiner.*

J. A. O'BRIEN, *Assistant Examiner.*

UNITED STATES PATENT OFFICE
CERTIFICATE OF CORRECTION

Patent No. 3,290,434 December 6, 1966

Dexter P. Cooper, Jr., et al.

It is hereby certified that error appears in the above numbered patent requiring correction and that the said Letters Patent should read as corrected below.

Column 2, line 2, for "redued" read -- reduced --; line 31, for "voltges" read -- voltages --; line 68, for "phosphor" read -- phosphors --; column 6, line 15, for "phospate" read -- phosphate --; column 7, line 46, for "tA" read -- At --; column 9, line 36, after "of" insert -- the --; column 11, line 29, for "waveelngth" read -- wavelength --; line 30, for "porgram" read -- program --; column 14, line 22, for "phosphorus" read -- phosphors --; column 14, after line 59, insert the following:

OTHER REFERENCES

Bess: "A Red-White Kinescope for Color Television", RCA Technical Notes, TN No. 182, (1958), TK 6554.R2t.

Signed and sealed this 7th day of November 1967.

(SEAL)
Attest:

EDWARD M. FLETCHER, JR.
Attesting Officer

EDWARD J. BRENNER
Commissioner of Patents